United States Patent [19]

Zanner et al.

[11] Patent Number: 4,725,011

[45] Date of Patent: Feb. 16, 1988

[54] SUPPLY MAGAZINE FOR SHEET FILM STACK

[75] Inventors: Johann Zanner, Unterhaching; Karl Neudecker, Munich, both of Fed. Rep. of Germany

[73] Assignee: Agfa-Gevaert AG, Leverkusen, Fed. Rep. of Germany

[21] Appl. No.: 7,357

[22] Filed: Jan. 27, 1987

[30] Foreign Application Priority Data

Feb. 14, 1986 [DE] Fed. Rep. of Germany ... 8603909[U]

[51] Int. Cl.[4] ...................... G03B 42/04; G01D 13/00

[52] U.S. Cl. ............................... 242/67.1 R; 116/285; 116/303; 206/459; 378/182

[58] Field of Search ................ 116/285, 303; 378/182, 378/188, 171; 242/74, 71.1, 195, 197, 57; 206/455, 459

[56] References Cited

U.S. PATENT DOCUMENTS

| | | | |
|---|---|---|---|
| 3,630,170 | 12/1971 | Christo | 116/303 |
| 4,194,625 | 3/1980 | Stievenart | 206/455 X |
| 4,248,172 | 2/1981 | Kröbel | 378/182 X |
| 4,313,538 | 2/1982 | Bauer | 206/459 X |
| 4,331,236 | 5/1982 | Bauer | 378/182 X |
| 4,394,772 | 7/1983 | Okamoto | 378/182 |
| 4,476,803 | 10/1984 | Malec | 116/271 X |
| 4,482,233 | 11/1984 | Bauer | 378/182 X |

FOREIGN PATENT DOCUMENTS

| | | |
|---|---|---|
| 7725804 | 1/1978 | Fed. Rep. of Germany . |
| 3122583 | 5/1985 | Fed. Rep. of Germany . |
| 3405423 | 5/1985 | Fed. Rep. of Germany . |
| 3122582 | 6/1985 | Fed. Rep. of Germany . |

*Primary Examiner*—Stuart S. Levy
*Assistant Examiner*—Katherine Matecki
*Attorney, Agent, or Firm*—Michael J. Striker

[57] ABSTRACT

A supply magazine for insertion in an arrangement for removing individual sheet films, for example X-ray sheet films, arranged in a stack in a light-tight wrapping, comprises a cover, a box which is at least partially open and is closable by the cover, and being formed for accommodating a stack located in a wrapping, a winding device provided with a winding shaft which is driven from outside and formed for suspending and winding a winding flap of the wrapping together with the latter after closing of the box, and an indicating device including a movable sensing member which abuts with spring biasing against the winding shaft in the region of the winding flap, an observation opening formed in a part of the box which supports the winding shaft and arranged so that the sensing member is visible through the observation window, and a light sealing provided between the winding shaft and the observation window.

8 Claims, 4 Drawing Figures

FIG. 1
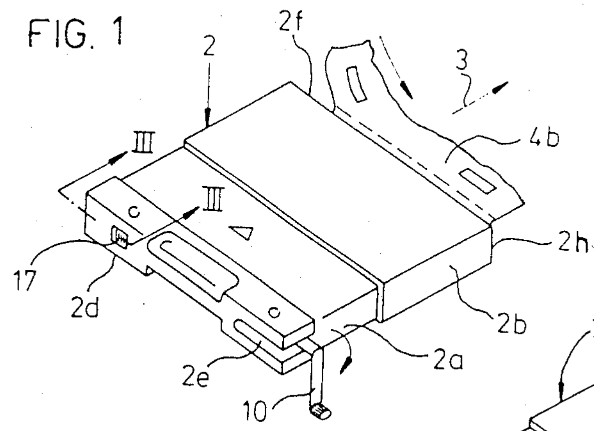
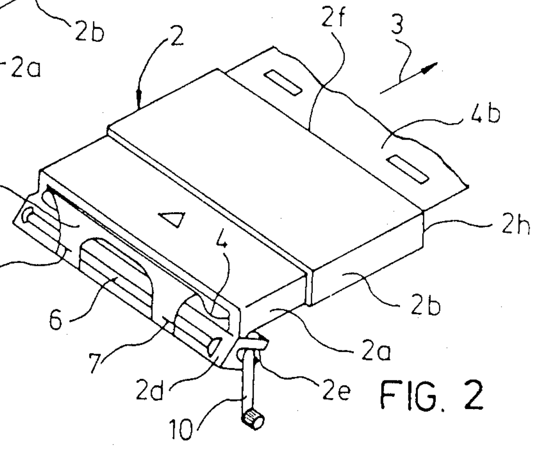
FIG. 2
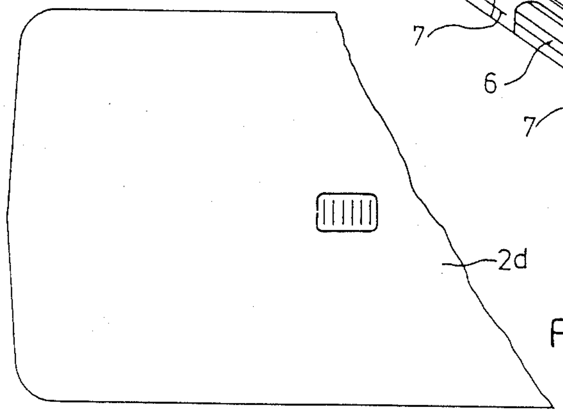
FIG. 4
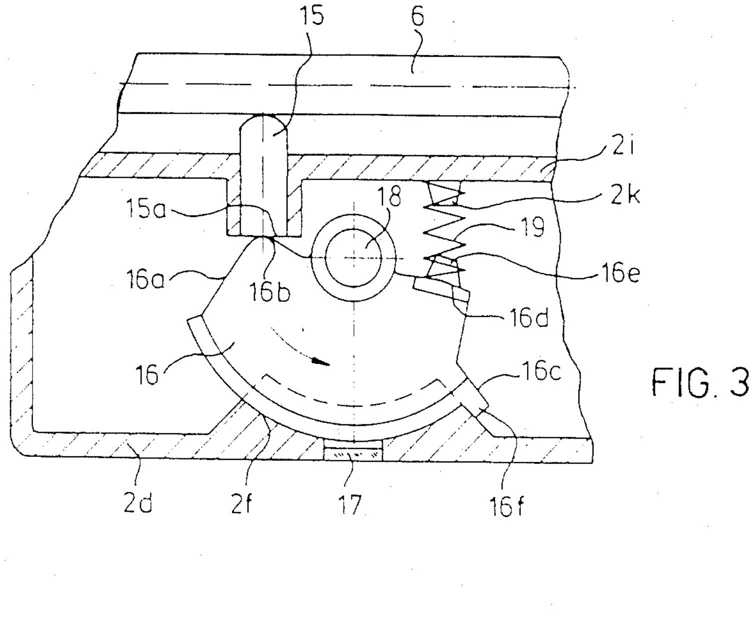
FIG. 3

SUPPLY MAGAZINE FOR SHEET FILM STACK

BACKGROUND OF THE INVENTION

The present invention relates to a supply magazine for insertion into an arrangement for removing individual sheet films, for example x-ray sheet films in which the sheet films are insertable into a light-tight wrapping openable at one side at a tearing flap with the closed supply magazine.

Supply magazines of the above mentioned general type are known in the art. A known supply magazine includes a box which is closable by a cover and accommodates a stack located in the wrapping. The box is provided at its side opposite to the tearing flap with a winding device which includes a winding shaft driveable from outside for suspending and winding a winding flap of the wrapping, together with wrapping after closing of the supply magazine. Such supply magazines are disclosed for example in the German documents DE-GM No. 7,725,804 or DE-PS No. 3,405,423. In the known magazines it is impossible after closing the same to recognize whether the wrapping is removed from the stack so that the individual film sheets can be withdrawn from the stack.

SUMMARY OF THE INVENTION

Accordingly, it is an object of the present invention to provide a supply magazine which avoids the disadvantages of the prior art.

More particularly, it is an object of the present invention to provide a supply magazine which is formed so that it is possible to recognize whether the wrapping is wound on the winding shaft during its rotation.

In keeping with these objects and with others which will become apparent hereinafter, one feature of the present invention resides, briefly stated, in a supply magazine in which a radially movable sensing member is spring biased against the winding shaft in the region of winding flaps to be wound, the sensing member or an indicating part coupled with the sensing member is visible through an observation window provided on a magazine part which supports the winding shaft, and a light sealing is arranged between the winding shaft and the observation window.

When the supply magazine is designed in accordance with these features, it achieves the above mentioned objects.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view showing a supply magazine in accordance with the present invention in a closed condition;

FIG. 2 is a view showing the supply magazine of FIG. 1 in a partially open condition;

FIG. 3 is a view showing a section of the magazine of FIG. 1, taken along the line III—III, and on an enlarged scale; and FIG. 4 is a view showing a plane view of a magazine surface which is provided with the observation window of FIGS. 1 and 3.

DESCRIPTION OF A PREFERRED EMBODIMENT

Arrangements for loading and unloading of x-ray sheet film cassettes are known which has drawers for insertion of supply magazines 2 for sheet film stack of different formats. The sheet film stack is provided with a light-tight wrapping in a dark chamber, introduced into a supply magazine 2 and then inserted in the closed magazine into the respective drawer of the arrangement.

The magazine is tightly closed and opened in the same, so that in the event of demand for a film stack of the respective sheet size, a sheet is removed from above and can be introduced into an emptied cassette. In such an arrangement which is disclosed in the German Pat. No. 3,122,583 a supply magazine is used, which is composed of a box 2*a* which is only partially open from above and a cover which is formed as a displacing pipe 2*b* and disclosed in the German Pat. No. 3,122,582. The inlet opening of the box 2*a* is located adjacent to an end side 2*h* of the box 2*a* as considered in an insertion direction 3 of the magazine 2. The insertion opening has such a size that a film stack is insertable into the box 2*a* and positionable in it, and in the displaced condition of the displacing pipe 2*b* is light-tightly closable by the displacing pipe. A rear end side 2*d* of the magazine as considered in the insertion direction 3 is arranged fixedly on the box 2*a* 2*a* of the known magazine 2 and formed as a gripping part for insertion of the magazine 2 into the arrangement 1 and withdrawing the magazine 2 from the arrangement.

For utilization of a magazine 2 as a daylight magazine, for insertion of a film stack together with its light-tight wrapping 4 and for removal of the wrapping 4 from the film stack after closing of the magazine 2, the rear end side 2*d* of the magazine is formed as a turnable rear wall which in its normal position provides light-tight closing. A winding shaft 6 is supported on the side walls of the box 2*a* or the rear wall 2*d* and located immediately behind the rear wall in the interior of the box 2*a*. The winding shaft 6 has clamps 7 for very firmly clamping a winding flap 4*a* on a newly inserted wrapping 4.

The winding shaft 6 can be coupled directly or via toothed wheels 8 and 9 with a winding crank 10 which leads in a light-tight manner from the rear wall 2*d* outwardly. The winding crank 10 can have a turnable, not shown hinge, so that it can be turned between the operative position shown in FIG. 1 and non-operative position in which it is turned into a depression 2*e* of the rear wall 2*d*. The non-operative position must be assumed during insertion of the magazine 2 into the arrangement 1. As shown in the drawings, the magazine 2 is formed so that at an end edge 2*f* of the displacing cover above the inlet opening, a wear strip is arranged.

The operation of the supply magazine 2 in accordance with the present invention is described hereinbelow. For loading of an empty magazine 2, the inlet opening is released by opening of the displacing cover 2*b*, and the winding shaft 6 is released by opening of the rear wall 2*d*. Then the wrapping 4 of the removed film stack and wound on the winding shaft 6 is pulled from the winding shaft and withdrawn from the box of a reinforcing and holding cardboard provided under the emptied stack. The cardboard is provided at its rear side with an upwardly extending abutment. The cardboard together with the abutment serves for preventing a displacement of the stack or its individual sheets by engagement with the wrapping during drawing the wrapping 4 from the stack in a closed magazine 2. Then a new film stack together with the wrapping 4 is inserted through the inlet opening into the box 2*a*. The winding flaps 4*a* are moved to the region of the winding shaft 6 and the winding shaft 6 is clamped by means of the clamps 7. Closing strips 4*b* of the wrapping provided at the end side in the arrangement 1 as considered in the insertion direction 3 of the magazine 2*a* must be easily tearable with the closed magazine 2 and therefore formed as a tearing flap 4*b*. The tearing flap 4*b* in the open magazine 2 is formed so that it appears between the tearing strip and the upper surface of, the end side 2*h* of the box outside of the magazine. This position is shown in FIGS. 1 and 2. Then the crank 10 is turned and the rear wall 2*d* is closed, as can be seen from the comparison of FIGS. 1 and 2. Finally, the tearing flap 4*b* is separated by hand by means and along the tearing strip. The wrapping 4 is opened at the end side in the closed magazine 2, so that it can be drawn rearwardly without any significant force. For this function only the crank 10 is moved, and the shaft 6 is turned. The winding flaps 4*a* and the wrapping 4 are preferably wound completely onto the shaft 6. Then the newly loaded magazine is introduced into the respective compartment of the arrangement.

In the above described magazine 2 it is not possible to recognize whether the winding of the wrapping on the winding shaft 6 and thereby the drawing of the wrapping 4 from the staple is performed in an orderly manner. It is for example not recognizable when during rotation of the crank 10 the flaps 4*a* have been released from the winding shaft 6 and the wrapping were not withdrawn from the stack. This could lead to considerable operational disturbances in the arrangement for loading and unloading of the film cassettes. In accordance with the present invention, an indicating device for indicating an orderly winding of the wrapping onto the winding shaft 6 is provided.

The indicating device has a movable sensing member 15 which is guided in a light-tight member radially toward the winding shaft 6 and abuts against the winding shaft with a spring-biasing. When the diameter of the winding shaft 6 increases because of the wrapping 4 wound on the latter, the sensing member 15 is pressed radially outwardly from the winding shaft 6. This movement can be indicated directly or via an indicating member 16 coupled with the sensing member 15, in an observation opening 17. The observation opening 17 is arranged in a magazine part in which the winding shaft 6 is supported. In the shown example it is the turnable rear wall 2*d*.

A light-tight intermediate wall 2*i* must be provided between the observation opening 17 or the wall part provided with the observation opening 17, and the winding shaft 6. The sensing member 15 passes through the intermediate wall 2*i* in a light-tight and movable manner. All known suitable light-tight elements can be used for this purpose, for example labyrinth steps or sealing rings of felt or synthetic plastic material. It is therefore not necessary to further elaborate on the light-tight support of the sensing member.

In the shown example the observation opening 17 is provided in the rear magazine end side or the rear side of the rear wall 2*d*. The sensing member is formed as a pin 15 extending through the intermediate wall 2*i* which is parallel to the rear wall in a light-tight member and movable substantially normal to this wall. An indicating member is formed as a sector 16 of a thin drum which is rotatable about an axle 18 extending normal to the pin axis and to the axis of the winding shaft 6. It rotates over a sufficient angular distance. The drum sector 16 has a substantially radial portion 16*a* provided with a projecting cam 16*b*. The cam 16*b* abuts under the action of the spring 19 against an end 15*a* of the sensing pin 15 facing away of the winding shaft 6.

The drum sector 16 has another substantially radial limiting portion 16*c* which is provided with a step sheet 16*d* with a bearing and guiding pin 16*e* for the spring 19. The spring 19 is formed as a helical spring. A further bearing and guiding pin 2*k* for the spring 19 is provided on the intermediate wall 2*i* and more particularly at its side facing toward the observation window 17. Both bearing and guiding pins 16*e* and 2*k* engage both ends of the helical spring 19 so as to guide and to support the spring.

For guiding the drum sector 16 and providing an abutment for the spring 19, the wall part of the rear wall 2*d* which forms the inner side of the observation opening 17 is formed somewhat wider than the outer supporting part 2*f* which is complementary to the outer surface of the drum sector 16. The radial limiting section 16*c* of the drum sector 16 projects radially beyond the outer surface and forms an abutment 16*f* together with the radial limiting section of the bearing part 2*f*.

In the initial position before the insertion of a film pack, the cam 16*b* lies under the action of the spring 19 against the sensing pin 15 and urges the same against the winding shaft 6. When the wrapping 4 is mounted with its mounting flaps 4*a* on the winding shaft 6, see FIG. 2, the rear wall 2*d* is closed and the crank 10 is turned, so that normally the wrapping 4 is wound on the winding shaft 6. With the increase of the winding diameter, the sensing pin 15 is pressed outwardly and rotates the drum sector 16 in the counterclockwise direction. This movement can be observed in the observation window 17 as indication for an orderly winding of the wrapping 4. It can be advantageous to provide the outer surface with the drum with a pattern of lines extending parallel to its end contour line, or with a scale extending along its periphery. In this case the movement of the drum sector 16 or full drawing of the wrapping 4 from the film stack can be easily recognized.

When the observation window is provided not in the rear side of the rear wall 2*d* in accordance with FIG. 3, but instead in an approximately vertical upper or lower wall part of the rear wall 2*d* but always outside of the intermediate wall 2*i* above the end 15*a* of the pin 15, the pin 15 itself can serve as an indicating element. In this case it must be respectively longer and provided for example with a scale along its longitudinal extension. The biasing spring can be formed in this case as a simple pressure spring clamped between the pin 15*a* and the rear end side of the rear wall 2*d*.

It will be understood that each of the elements described above, or two or more together, may also find a useful application in other types of constructions differing from the types described above.

While the invention has been illustrated and described as embodied in a supply magazine for insertion into an arrangement for withdrawing individual sheet films, preferably x-ray sheet films, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A supply magazine for insertion in an apparatus for removing individual sheet films, for example x-ray sheet films, said sheet films being arranged in a stack and having a light-tight wrapping, the supply magazine comprising a cover; a box which is at least partially open and is closable by said cover, said box being formed for accommodating said sheet film stack and its light-tight wrapping; a winding device provided with a winding shaft for engaging and winding a winding flap of the light-tight wrapping together with the light-tight wrapping after closing of said box; means for driving said shaft from outside said box; and indicating means including a movable sensing member which abuts against said winding shaft in the region of said winding flap; and senses the presense of the light-tight wrapping as it is wound upon the shaft; a pivotable indicating member including a cam surface which is spring-biased into engagement with said movable sensing member; an observation window formed in a part of said box which supports said winding shaft and arranged so that said pivotable indicating member is visible through said observation window, and a light seal provided between said winding shaft and said observation window.

2. A supply magazine as defined in claim 1, wherein said movable sensing member is formed as a pin which is biased radially against said winding shaft.

3. A supply magazine as defined in claim 1, wherein said movable sensing member is formed as a pin, said indicating member being formed as a pivotable indicating drum sector having two radial surfaces, one of said radial surfaces comprising said cam surface, said pin having an end remote from said winding shaft and abutting against said cam surface, the other of said radial surfaces having a step; and further comprising a spring abutting against said step.

4. A supply magazine as defined in claim 1, wherein said indicating member is formed as a drum sector having a predetermined outer shape, said observation window having an edge, said part of said box provided with said observation window having in the region of said edge of said observation window a trough which is complementary to said outer shape of said drum sector and forms a support and guide for said drum sector.

5. A supply magazine as defined in claim 4, wherein said trough has a radial edge, said drum sector having a radial surface which is provided with an abutment supported on said radial edge of said trough.

6. A supply magazine as defined in claim 1, wherein said light seal comprises a wall extending between said observation window and said winding shaft, said sensing member being formed as a pin extending through said wall in a light-tight manner; and further comprising a spring which biases said pin against said winding shaft.

7. A supply magazine as defined in claim 6, wherein said spring being formed as a helical spring abutting against said wall and said indicating member.

8. A supply magazine as defined in claim 7, wherein said indicating member has a radial surface; and further comprising means for engaging said helical spring and including bearing and guiding pins arranged on said wall and on said radial surface of said drum sector respectively and engaging said helical spring.

* * * * *